(12) United States Patent
Hartmann et al.

(10) Patent No.: US 7,278,323 B2
(45) Date of Patent: Oct. 9, 2007

(54) METHOD AND APPARATUS FOR DETERMINING THE DEFLECTION OF A FASTENER

(75) Inventors: Gunther Hartmann, Alsfeld (DE); Wolfgang Deeg, Homberg/Ohm (DE)

(73) Assignee: KAMAX-Werke Rudolf Kellermann GmbH & Co. KG, Osterode am Harz (DE)

(*) Notice: Subject to any disclaimer, the term of this patent is extended or adjusted under 35 U.S.C. 154(b) by 110 days.

(21) Appl. No.: 11/324,360

(22) Filed: Jan. 3, 2006

(65) Prior Publication Data
US 2006/0144158 A1 Jul. 6, 2006

(30) Foreign Application Priority Data
Jan. 3, 2005 (DE) ............. 10 2005 000 610

(51) Int. Cl.
*F16B 31/02* (2006.01)
(52) U.S. Cl. ............. 73/761; 73/800; 73/849; 356/138; 356/237.1
(58) Field of Classification Search .......... 73/761, 73/800, 849
See application file for complete search history.

(56) References Cited

U.S. PATENT DOCUMENTS

| | | | | |
|---|---|---|---|---|
| 4,574,642 | A | * | 3/1986 | Fleischman ............ 73/799 |
| 4,591,996 | A | * | 5/1986 | Vachon .................. 702/42 |
| 4,841,779 | A | * | 6/1989 | Mitsuhashi et al. ...... 73/826 |
| 4,969,106 | A | | 11/1990 | Vogel et al. ............ 364/508 |
| 5,189,492 | A | | 2/1993 | Sollinger et al. ........ 356/373 |
| 5,591,921 | A | | 1/1997 | Schaede .................. 73/849 |

(Continued)

FOREIGN PATENT DOCUMENTS

DE 29 45 456 5/1980

(Continued)

OTHER PUBLICATIONS

Lu, R.S., et al., "On-Line Measurement of the Straightness of Seamless Steel Pipes Using Machine Vision Technique", Oct. 31, 2001, Sensors and Actuators A, Elsevier Sequoia S.A., Lausanne, Ch., pp. 95-101, XP004318405, ISSN: 0924-4247.

*Primary Examiner*—Edward Lefkowitz
*Assistant Examiner*—Freddie Kirkland, III
(74) *Attorney, Agent, or Firm*—Thomas, Kayden, Horstemeyer & Risley, LLP

(57) ABSTRACT

A method and an apparatus serve for determining the deflection of a fastener, especially a screw. The method includes the steps of (a) recording a first image of the fastener with a first camera; (b) determining two first reference points of the fastener in the first image for determining a first reference axis of the fastener, the first reference axis extending through the two first reference points; (c) determining a first inspection point in a first inspection region in the first image; (d) comparing the position of the first inspection point with the respective position of the first reference axis for determining a first deviation; (e) recording a second image of the fastener with a second camera, the optical axis of the second camera being substantially perpendicular to the optical axis of the first camera, the optical axes of the first and second camera approximately intersecting in the longitudinal axis of the fastener; (f) determining two second reference points of the fastener in the second image for determining a second reference axis of the fastener, the second reference axis extending through the two second reference points; (g) determining a second reference point in a second inspection region in the second image; and (h) comparing the position of the second inspection point with the respective position of the second reference axis for determining a second deviation.

20 Claims, 8 Drawing Sheets

U.S. PATENT DOCUMENTS 6,006,608 A * 12/1999 Renz et al. .................. 73/800
6,912,047 B2 * 6/2005 Furiya et al. ............ 356/237.1
7,036,364 B2 * 5/2006 Swillo et al. ................. 73/159

FOREIGN PATENT DOCUMENTS

| | | |
|---|---|---|
| DE | 3825415 A1 | 4/1990 |
| DE | 3817387 C2 | 2/1991 |
| DE | 4090293 T1 | 1/1992 |
| DE | 4037934 A1 | 5/1992 |
| DE | 29503708.3 | 6/1995 |
| DE | 4409153 A1 | 9/1995 |
| EP | 0706886 B1 | 6/1999 |
| JP | 61105409 | 5/1986 |
| JP | 08159732 | 6/1996 |

* cited by examiner

METHOD AND APPARATUS FOR DETERMINING THE DEFLECTION OF A FASTENER

CROSS REFERENCE TO RELATED APPLICATIONS

This application claims priority to co-pending German Patent Application No. DE 10 2005 000 610.8 entitled "Verfahren und Vorrichtung zum Bestimmen der Durchbiegung eines Verbindungselements", filed Jan. 03, 2005.

FIELD OF THE INVENTION

The present invention generally relates to a method and an apparatus for determining the deflection of a fastener. More particularly, the present invention relates to a method and an apparatus for determining the deflection of a screw.

The manufacture of elongated components or elements often results in undesired bending and deflection, respectively, of the components. Especially in case the component is a fastener, one main reason for this deflection is thermal treatment of the component during which the fastener is heated to reach a high temperature. Consequently, strength and stability of the material of the fastener are substantially reduced. These bending effects and deflections, respectively, result from the weight of the fastener in combination with transporting the fastener through a furnace (which usually is designed as a continuous strip furnace). The multilayer arrangement of the fasteners in the furnace which is required for reasons of throughput even increases this undesired effect. Due to the deflection, there may be problems during assembly of the fasteners.

BACKGROUND OF THE INVENTION

An apparatus for determining the deflection of an elongated component is known from German Patent Application No. DE 38 25 415 A1 corresponding to U.S. Pat. No. 5,189,492. Preferably, the elongated component is a beam being supported at its two axial ends. For example, the beam is a beam for the scraper blade of a paper coater or for the upper lip of a paper machine head box. The apparatus includes a transmitting unit for electromagnetic radiation or light which is connected to the beam in the center portion of the beam. Receiving units for the electromagnetic radiation and for the light, respectively, are arranged in the regions of the two axial ends of the beam. The receiving units include sensor means serving to detect the inclination of the radiation being sent by the transmitting unit. The deflection of the beam is determined based on the inclination. The known apparatus requires a fixed connection of the transmitting unit as well as of the receiving unit and the beam. Thus, it is not suitable for moving components which are to be analyzed during material flow.

An apparatus for determining the deflection of a cylinder of a rotary printing press is known from European Patent No. EP 0 706 886 B1 corresponding to U.S. Pat. No. 5,591,921. A bending rod is connected to the cylinder journal of the rotary printing press. During bending of the cylinder, the bending rod is subjected with a bending force and with bending torque which results in bending of the bending rod. Bending is sensed by strain gauges, and it is determined by an electronic unit. The determined values are used as a measure for the forces acting upon the cylinder. The known apparatus is not suitable for moving components which are to be analyzed during material flow.

Methods and apparatuses for determining bending and deflections, respectively, of elongated components without contacting the components and being based on images being taken by cameras and being processed by a calculating unit are known from German documents Nos. DE 40 37 934 A1, DE 44 09 153 A1, DE 295 03 708 U1 and DE 38 17 387 C2. The German document DE 40 90 293 T1 corresponding to U.S. Pat. No. 4,969,106 further describes such a method and an apparatus in relation to a flat surface.

Furthermore, it is generally known in the art of fasteners to use apparatuses for determining the deflection of a fastener in which the fastener is supported on two supports and in which the supported fastener is rotated in front of a measuring sensor. For this purpose, it is necessary to introduce the respective fastener into the apparatus in a singled out way and to at least rotate it by 180°.

SUMMARY OF THE INVENTION

The present invention generally relates to a method for determining the deflection of a fastener.

More particularly, the present invention relates to a method of determining the deflection of a fastener in two substantially perpendicular planes, the method including the steps of:

(a) recording a first image of the fastener with a first camera having an optical axis;

(b) determining two first reference points of the fastener in the first image for determining a first reference axis of the fastener, the first reference axis extending through the two first reference points;

(c) determining a first inspection point in a first inspection region in the first image;

(d) comparing the position of the first inspection point with the respective position of the first reference axis for determining a first deviation;

(e) recording a second image of the fastener with a second camera having an optical axis, the optical axis of the second camera being substantially perpendicular to the optical axis of the first camera, the optical axes of the first and second camera approximately intersecting in the longitudinal axis of the fastener;

(f) determining two second reference points of the fastener in the second image for determining a second reference axis of the fastener, the second reference axis extending through the two second reference points;

(g) determining a second reference point in a second inspection region in the second image; and (h) comparing the position of the second inspection point with the respective position of the second reference axis for determining a second deviation.

The present invention also generally relates to an apparatus for determining the deflection of a fastener.

More particularly, the present invention relates to an apparatus for determining the deflection of a fastener in two substantially perpendicular planes. The apparatus includes a first camera. The first camera has an optical axis. The first camera is designed and arranged to record a first image of the fastener. A unit is designed and arranged to determine two first reference points of the fastener in the first image for determining a first reference axis of the fastener, the first reference axis extending through the two first reference points. This unit or a different unit is designed and arranged to determine a first inspection point in a first inspection region in the first image. This unit or a different unit is designed and arranged to compare the position of the first inspection point with the respective position of the first reference axis for determining a first deviation. A second camera has an optical axis. The optical axis of the second camera is arranged to be substantially perpendicular to the optical axis of said first camera. The optical axes of said first and second camera approximately intersect in the longitudinal axis of the fastener. The second camera is designed and arranged to record a second image of the fastener. The aforementioned unit or a different unit is designed and arranged to determine two second reference points of the fastener in the second image for determining a second reference axis of the fastener. The second reference axis extends through the two second reference points. The aforementioned unit or a different unit is designed and arranged to determine a second reference point in a second inspection region in the second image. The aforementioned unit or a different unit is designed and arranged to compare the position of the second inspection point with the respective position of the second reference axis for determining a second deviation.

With the novel method and apparatus for determining the deflection of a fastener, it is possible to determine the deflection of the fastener during its movement in the material flow in an effective and cost-efficient way.

The term "deflection" of the fastener is to be understood herein as relating to the difference between the actual center axis of the fastener and the theoretical (or ideal, desired) center axis of the fastener. The term "deflection" is to be interpreted in this sense at least to include bending and a lack of concentric running of the fastener without an external load. Typical fasteners to be analyzed are screws, bolts and rivets.

The present invention is based on the concept of arranging two cameras such that their optical axes are located approximately perpendicular with respect to one another and approximately perpendicular to the longitudinal axis of the fastener to be analyzed. Preferably, both cameras observe the entire fastener. In this way, bending and deflection, respectively, of the fastener can be determined in two planes being located approximately perpendicular with respect to one another. Since the fastener will usually not be oriented in front of the cameras in a way that its actual deflection can be measured in the image plane of one camera image, the Pythagorean Theorem is used to calculate the actual deflection of the fastener in three dimensions.

In the following, the novel method and the operation of the novel apparatus will be described and explained in greater detail.

Determination of a Reference Axis

For determining the deflection of the fastener, at first, two reference regions are defined in the first camera image, preferably by software. The two reference regions indicate the region in which the camera image is to be evaluated with respect to the contour of the fastener contained in the image to determine reference points. Based on suitable illumination, preferably counterlight, the contour of the fastener may be represented as a dark shadow on a light image background. Thus, the contour may be well analyzed. In each of the reference regions, a reference point is determined by a suitable method. Preferably, the method is the one of the center of the area. These two reference points are then interconnected to form a first reference axis. Later in the process, the deflection of the fastener will be determined based on the reference axis.

The reference portions can be determined at the axial ends of the fastener to be analyzed. In case of a screw, they are preferably located in the region of the shank of the screw. Alternatively, the two reference portions may be defined at a different place of the fastener.

The above described method for determining a reference axis is also conducted for the second camera image in the same way. This means that a second reference axis is determined.

Definition of an Inspection Region

Furthermore, an inspection region or portion is defined in the first camera image. The maximum deflection of the fastener will practically be located approximately in the center region of the fastener. In case the reference portions are located at the axial ends of the fastener to be measured, the inspection region will be defined approximately in the center of the fastener. However, in case the reference regions are located to be adjacent and at a defined distance from one axial end of the fastener, it is preferred to locate the inspection region at the opposite axial end of the fastener. Due to the fact that the inspection region is especially defined in the recorded image by software, a change from one arrangement to the other is possible without difficulty.

As mentioned before, the maximum deflection of a bent component usually is located close to the axial center portion of the component. To be capable of correctly determining a certain variation range of the position of the region of the maximum deflection and bending, respectively, it is preferred to choose the inspection region to be preferably large. The upper limit of the size of the inspection region is the danger of not being able to exactly determine the maximum deflection in case the inspection region is extremely large.

To prevent negative influences concerning the exactness, for example influences by dirt particles, it has been found to be advantageous to determine the two outer contours of the component in the inspection region and to even out the shape of the contour before determining the inspection point. However, other algorithms are also possible.

It is to be understood that at least one inspection region is defined in each of the images of the two cameras. However, it is also possible to define and evaluate a greater number of inspection regions.

The above described method of defining an inspection region is respectively conducted for the second camera image. Thus, at least one inspection region is determined in the region of the second camera.

Determination of an Inspection Point

A variety of different methods for evaluating the contour of the fastener in the inspection region and for determining one inspection point of a plurality of inspection points may be realized in processing the images of the cameras. The methods of determining are chosen to be comparatively insensitive to unpreventable interferences. For example, such interferences may be caused by particles of dust sticking to the fasteners, deformations of a thread of the fasteners and the like. Furthermore, there may be numerical rounding errors which, for example, are caused by the finite resolution of the camera. This especially leads to interferences in case the component to be checked is not positioned to be perpendicular with respect to the camera image.

A first method for evaluating the contour of the fastener in the inspection region is the one of the center of an area. In this method, the center of the respective area or surface of the fastener in the inspection region is determined. It has been found that this method is especially insensitive to interferences.

Another possibility is based on the determination of the respective outer edge of the transition between light and dark in the camera image. More precisely, in this determination method called the radius deviation, the distance between the radial outermost point of the inspection portion at the first radial end of the inspection region with respect to the reference axis is determined. The respective distance to the reference axis is also determined for the second radial outermost point at the opposite radial side of the fastener in the inspection region. The difference between these two distances results in the position of the inspection point and its distance to the reference axis. The method of the center of the area and the method of the radius deviation both make use of the fact that the bending line (or the elastic line) of bent components practically has the greatest curvature approximately in the axial middle portion of the component. The curvature of the component is comparatively small at the ends of the component, meaning the longitudinal axis of the component is approximately linear in these regions.

A third determination method is the one of the inspection axis. For this method, two inspection regions are used. An inspection point is determined in each one of the two inspection regions as the center of the area of the respective area. The two inspection points are then interconnected by an inspection axis. In the following, the distance between the inspection axis and the reference axis is determined.

Each of the inspection points is especially determined by at least two determination methods. Preferably, three different determination methods are used one after the other, each one serving to determine a preliminary inspection point to then calculate the final inspection point based on these preliminary inspection points. This calculation may possibly take into account a weighing factor. It has been found to be advantageous for determining an inspection point to use all three above mentioned determination methods, meaning the one of the center of the area, the one of the radius deviation and the one of the inspection axis.

It is to be understood that this method (and these methods) are separately conducted for both camera images as this has been explained before.

Determination of the Actual Deflection

In the following, the actual deflection is determined based on the two deflection values of the two camera images. For this purpose, the two individually determined distances (or deviations) of the inspection points with respect to the reference line are calculated by the Pythagorean Theorem to attain the total distance (or deviation). The total distance is then compared with the desired value of the geometry of the fastener.

An exact alignment of the fastener with respect to the cameras is not required. In this way, it is possible to analyze the fasteners during their linear movement within a material flow. This allows for high analyzing velocities and thus increased throughput. Due to automatic evaluation of the results of the analysis and a comparison with the desired value under consideration of a tolerance, it is possible to produce a go/no-go signal with which a respectively controlled ejector automatically singles out the fasteners after completion of the analysis.

To prevent mutual influence of the two cameras being arranged to be substantial perpendicular with respect to one another due to the illuminating unit of the respective other camera, it is possible to use polarization filters, for example. Especially in case of light or dark reflecting fasteners, one attains decoupling of the two optical systems. For each one of the two cameras, preferably a polarization filter being oriented in the same way is used, the polarization filter being designed and arranged to only allow for passage of the light of the associated source of light, whereas the light of the other optical system is prevented from passage.

In case of especially long components, there may be problems with the maximum resolution of the cameras. The resolution of the cameras and thus the exactness of analysis are directly proportional to the number of dots. When the image field is large due to the substantial length of the component, there may be reduced exactness in the transverse direction. In this case, it is advantageous to use lenses or mirrors which optically distort in the direction of the longitudinal axis in a way that the image of the component is optically upset only in one direction. The distortions thereby occurring on the imaging chip of the camera are insofar acceptable as it is not desired to determine the length of the component, but instead only its deflection in relation to a reference axis.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
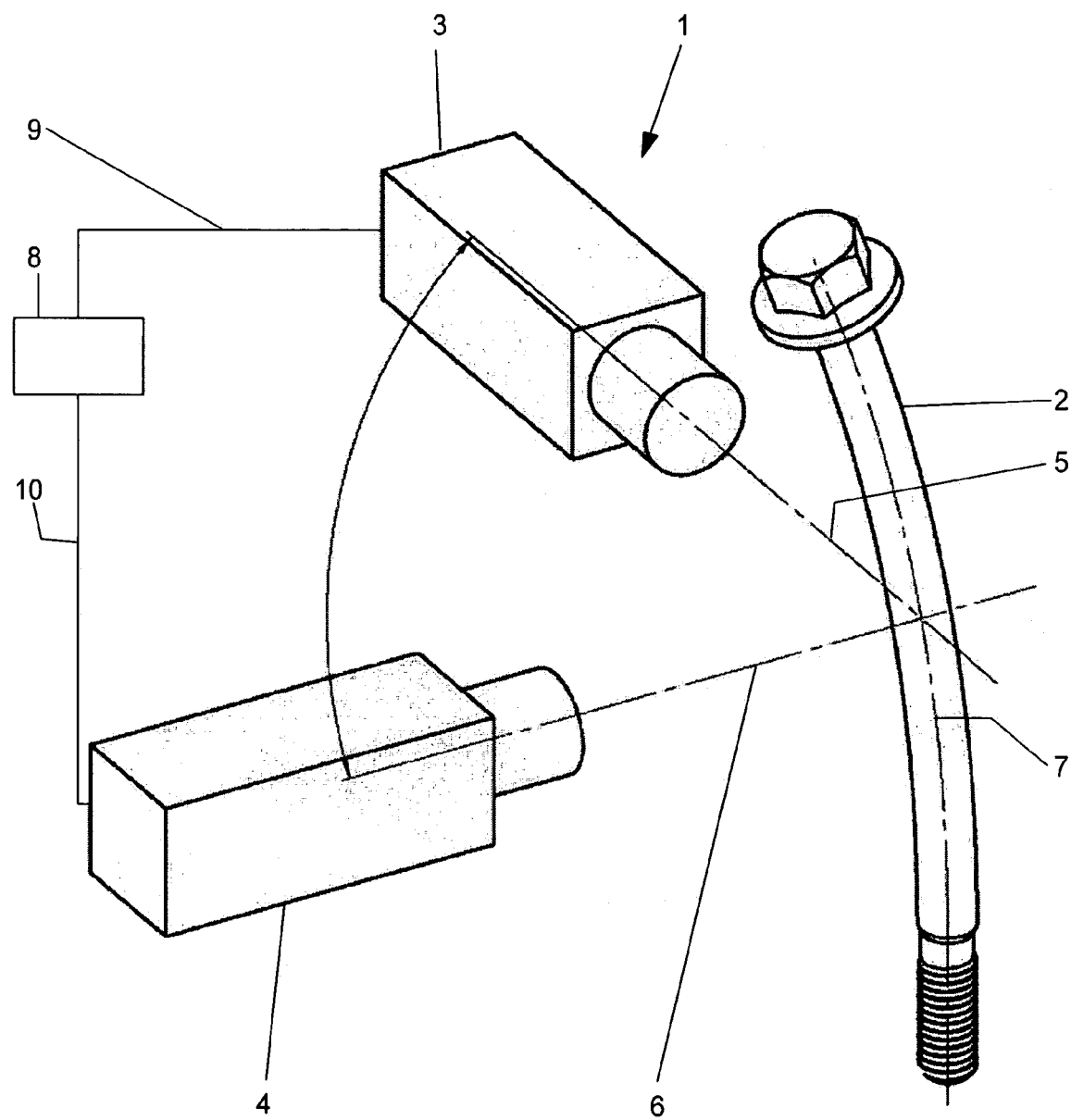
FIG. 1 is a view of the general arrangement of the novel apparatus for determining the deflection of a fastener.

Referring now in greater detail to the drawings, FIG. 1 illustrates the general design of a novel apparatus 1 for determining the deflection of a fastener 2. The apparatus 1 is only schematically illustrated. The detailed technical design of the wiring for transmitting and evaluating the optical signals is known to a person with skill in the art such that it does not need to be explained herein in greater detail.

The apparatus 1 includes a first camera 3 for taking a first image of the fastener 2. Furthermore, there is a second camera 4 for taking a second image of the fastener 2. The camera 3 has an optical axis 5, and the camera 4 has an optical axis 6. The optical axis 6 of the second camera 4 is located to be substantially perpendicular to the optical axis 5 of the first camera 3. The optical axes 5, 6 of the cameras 3, 4 approximately intersect in the longitudinal axis 7 of the fastener 2. The apparatus 1 further includes a unit 8. The unit 8 serves to evaluate the signals of the cameras 3, 4, as this will be explained in greater detail with respect to the following drawings. The unit 8 preferably is designed as a personal computer or any other suitable electronic control unit including evaluation software. It is to be understood that it is also possible to use a plurality of separate or combined units 8 for evaluating the signals of the cameras 3, 4 instead of the illustrated common unit 8. FIG. 1 only schematically illustrates the connections between the unit 8 and the cameras 3, 4 by electric lines 9, 10.

Figure 2:
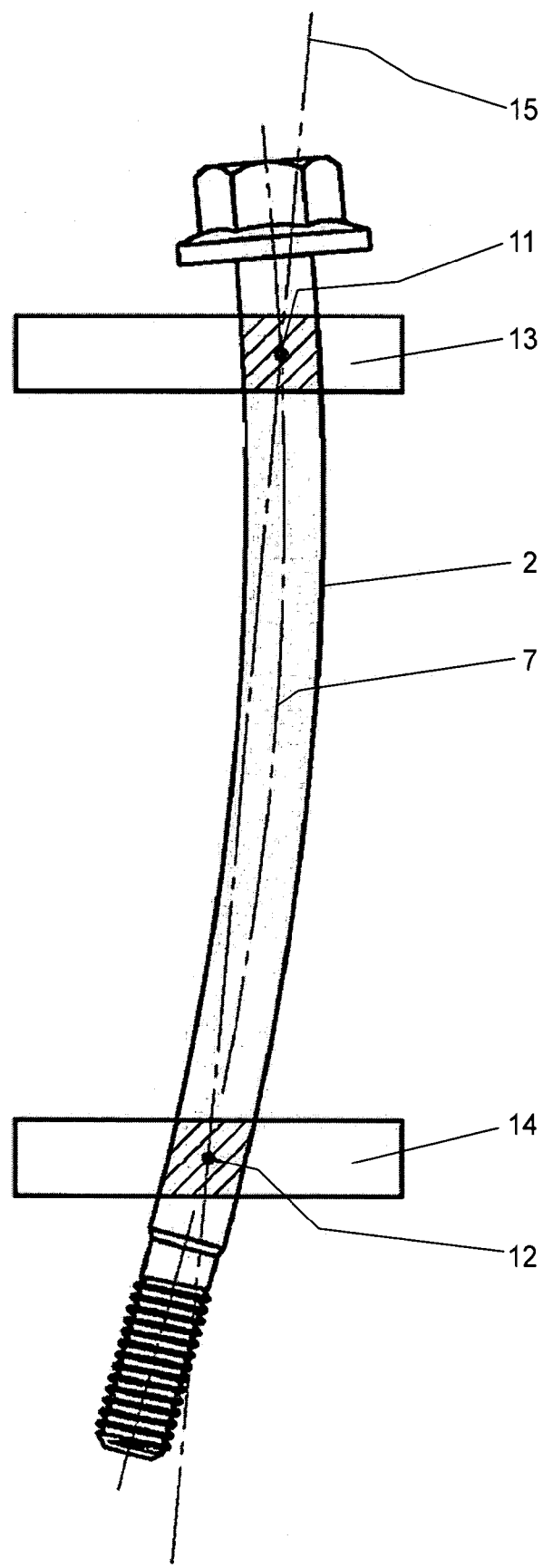
FIG. 2 illustrates the determination of a reference axis by the determination method of the center of the area.

With reference to FIG. 2, a method for determining the deflection of the fastener 2 will be explained in greater detail in the following. At first, two reference points 11, 12 of the fastener 2 are determined in the camera image of the camera 4 by the unit 8. The reference point 11 is determined in a reference region 13 of the camera image, and the reference point 12 is determined in the reference region 14 of the camera image. The reference regions 13, 14 are defined in the software of the unit 8. In the present exemplary embodiment, the reference regions 13, 14 are located in the region of the axial ends of the fastener 2. However, it is also possible to arrange these reference regions 13, 14 at different locations of the fastener 2 and to evaluate the camera image in these regions. In the illustrated embodiment, the respective reference point 11, 12 is determined as the center of the area of the fastener 2 in the associated reference region 13, 14 by the determination method of the center of the area. However, it is also possible to use other determination methods, as this has been explained hereinabove. In a next step, the reference axis 15 is formed, the reference axis 15 extending through the reference points 11, 12. The reference axis 15 corresponds to the ideal shape of the fastener 2, meaning in the illustrated example a screw having no deflection. As it is to be seen in FIG. 2 in an exaggerated representation, the longitudinal axis 7 of the fastener 2 in the present case differs from the reference axis 15.

A first method of determining the deviation of the longitudinal axis 7 of the fastener 2 from the reference axis 15 is explained in the following with respect to FIG. 3. This method is conducted on the first image of the first camera (in this case: camera 4). In addition to the reference points 11, 12 and the reference axis 15, an inspection region 16 is to be seen in FIG. 3. In this inspection region 16, the center point and the center of the area of the fastener 2, respectively, in the inspection region 16 is determined by the determination method of the center of the area. The point resulting therefrom is designated as the inspection point 17. The position of the inspection point 17 is then compared with the respective position of the reference axis 15 for determining the deviation of the fastener 2 in the plane of the recorded image. The deviation is to be seen by the arrows 18, 19 in FIG. 3.

Figure 4:
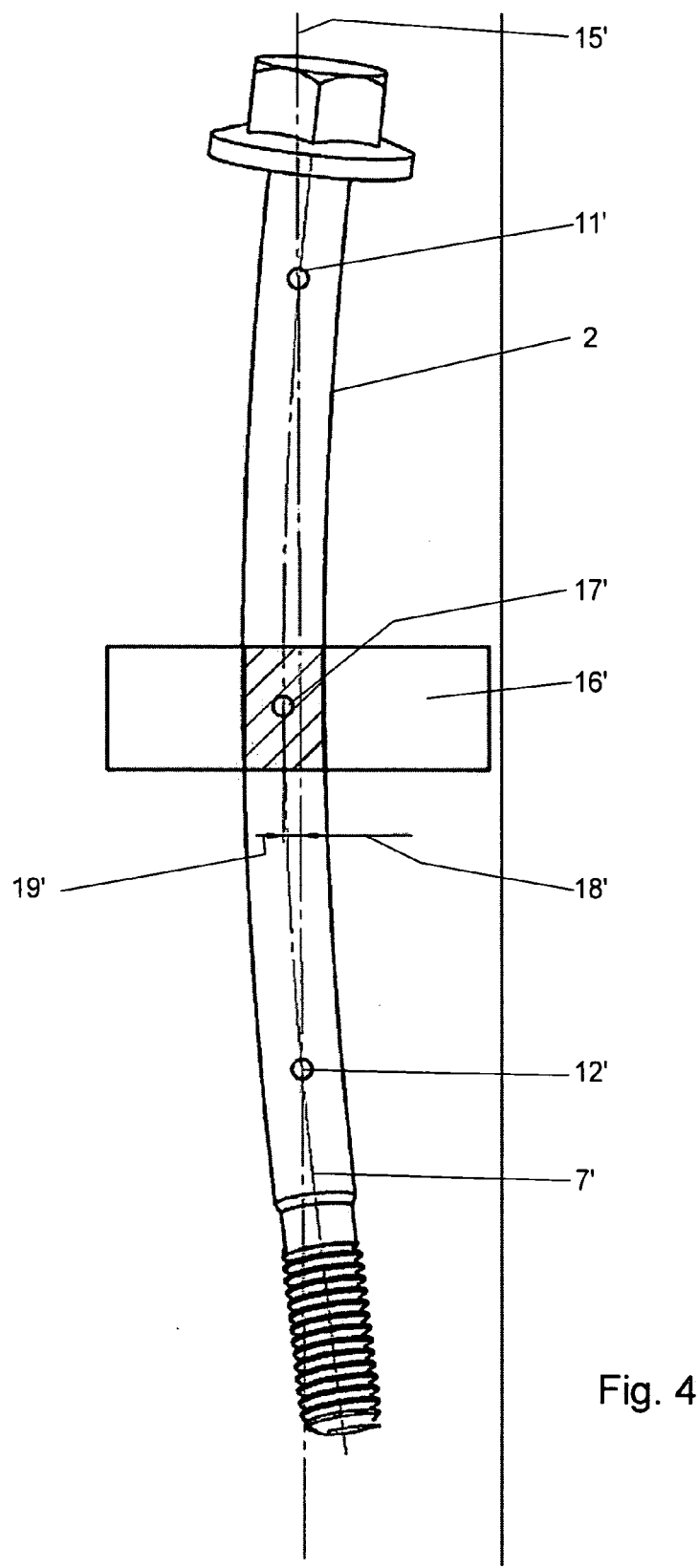
FIG. 4 illustrates the determination of the deviation of the fastener by the determination method of the center of the area in a first image of the second camera.

The above described method is at least conducted for two images, meaning not only for the first image of the first camera 3, but also for the image of the second camera 4, as this is illustrated in FIG. 4. Once again, two reference points 11', 12' of the fastener 2 are determined in the camera image of the camera 4. The reference point 11' is determined in a reference region 13', and the reference point 12' is determined in a reference region 14' (not illustrated, please respectively compare FIG. 2) of the camera image. The reference regions 13', 14' are defined by the software stored in the unit 8. In the present exemplary embodiment, the reference portions 13', 14' are arranged in the region of the axial ends of the fastener 2. However, it is also possible to arrange these reference regions 13', 14' at other locations of the fastener 2, and to evaluate the camera image at this place. In the illustrated example, the respective reference point 11', 12' is determined as the center point and the center of the area of the fastener 2, respectively, in the associated reference region 13', 14' by the determination method of the center of the area. However, it is also possible to use other determination methods, as this has been explained hereinabove. In a next step, the reference axis 15' is formed, the reference axis 15' extending through the reference points 11', 12'. The reference axis 15' corresponds to the ideal shape of the fastener 2, meaning to a screw having no deflection in case of the illustrated example. As it is to be seen in FIG. 4 in an exaggerated representation, in the present case, the longitudinal axis 7' of the fastener 2 deviates from the reference axis 15'. In addition to the reference points 11', 12' and the reference axis 15', an inspection region 16' is to be seen in FIG. 4. In this inspection region 16', the center point and the center of the area of the fastener 2, respectively, in the inspection region 16' is determined by the determination method of the center of the area. This point is designated as the inspection point 17'. The position of the inspection point 17' is then compared to the respective position of the reference axis 15' for determining the deviation of the fastener 2 in the plane of the recorded image. The deviation is to be seen by the arrows 18', 19' in FIG. 4.

Figure 3:
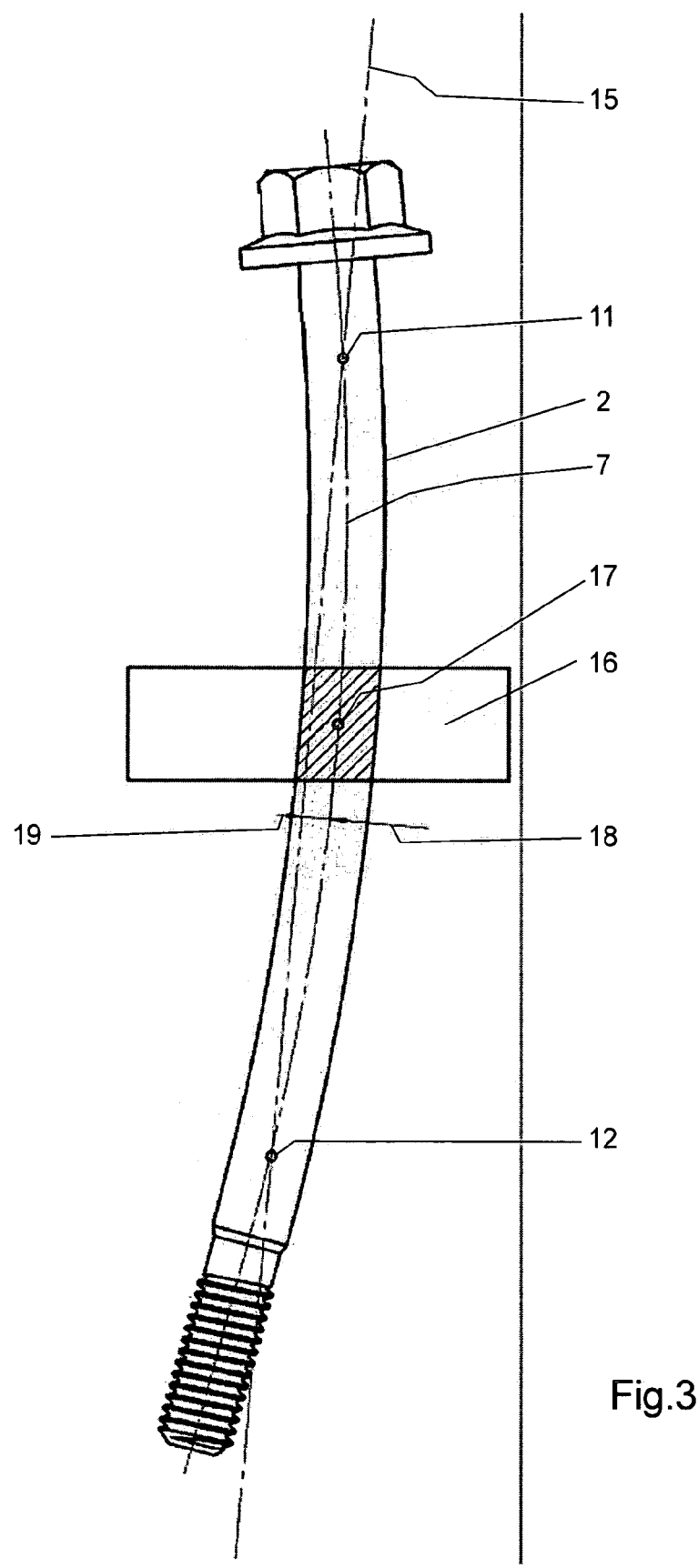
FIG. 3 illustrates the determination of the deviation of the fastener by the determination method of the center of the area in a first image of the first camera.

Due to the perpendicular arrangement of the cameras 3, 4 with respect to one another (FIG. 1) the actual deflection of the fastener 2 may then be calculated according to the Pythagorean Theorem starting from on the two determined deviations (FIGS. 3 and 4). Based on the Pythagorean Theorem according to the equation $a^2+b^2=c^2$, the actual deflection c is determined as follows:

$$c=\sqrt{a^2+b^2}$$

Figure 5:
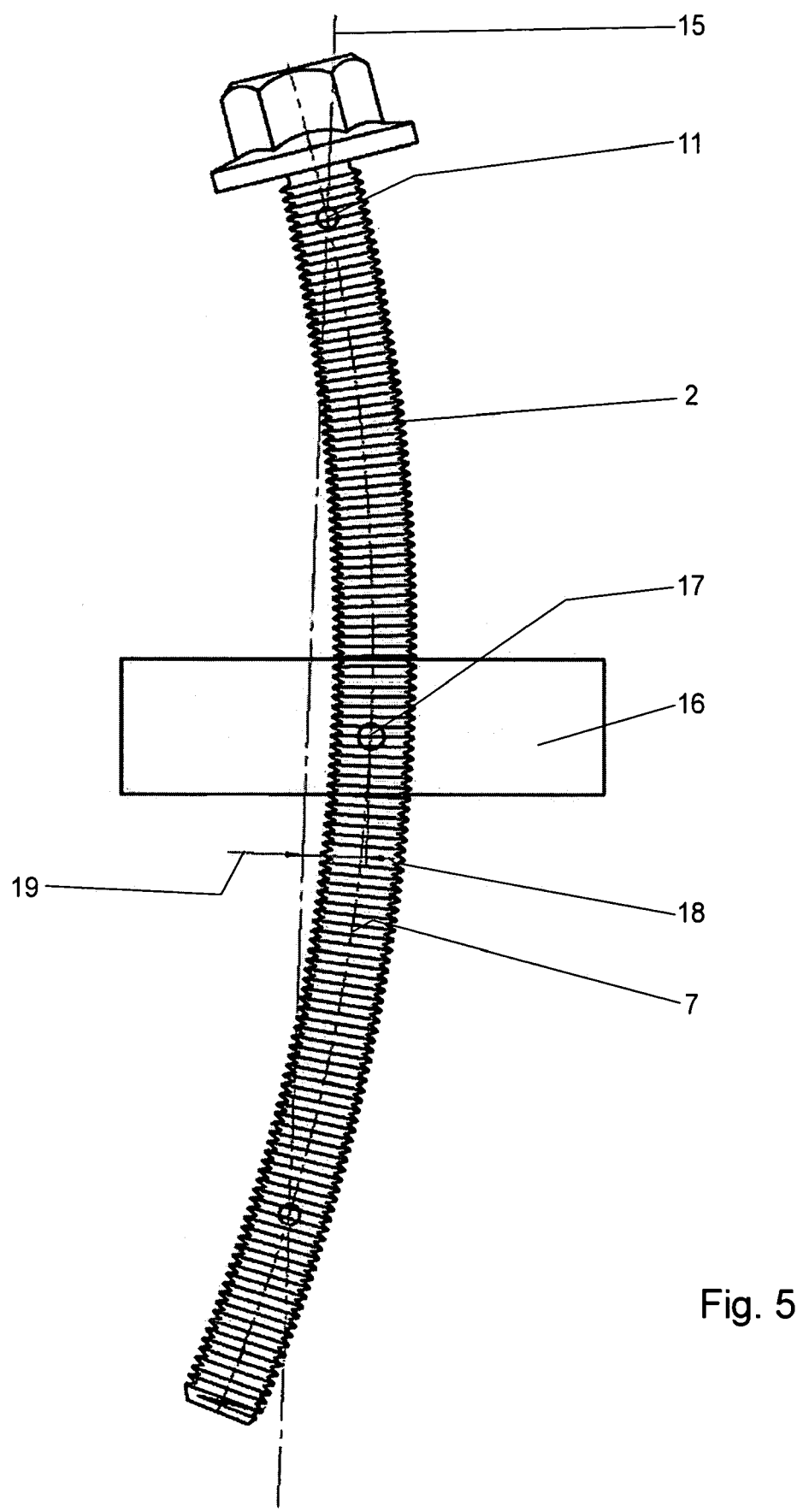
FIG. 5 illustrates the determination of the deviation of another fastener by the determination method of the center of the area.

FIG. 5 also illustrates the determination method of the center of the area for determining the deviation of the inspection point 17 with respect to the position of the respective point located on the reference axis 15. In contrast to FIG. 3, the fastener 2 in this case is designed as a screw having a thread which approximately extends over the entire length of the shank of the screw. It is to be understood that other arrangements of threaded portions, shank portions, fitting portions and the like at the fastener 2 are also possible. In addition, other kinds of fasteners 2 may be analyzed by the novel method.

Figure 6:
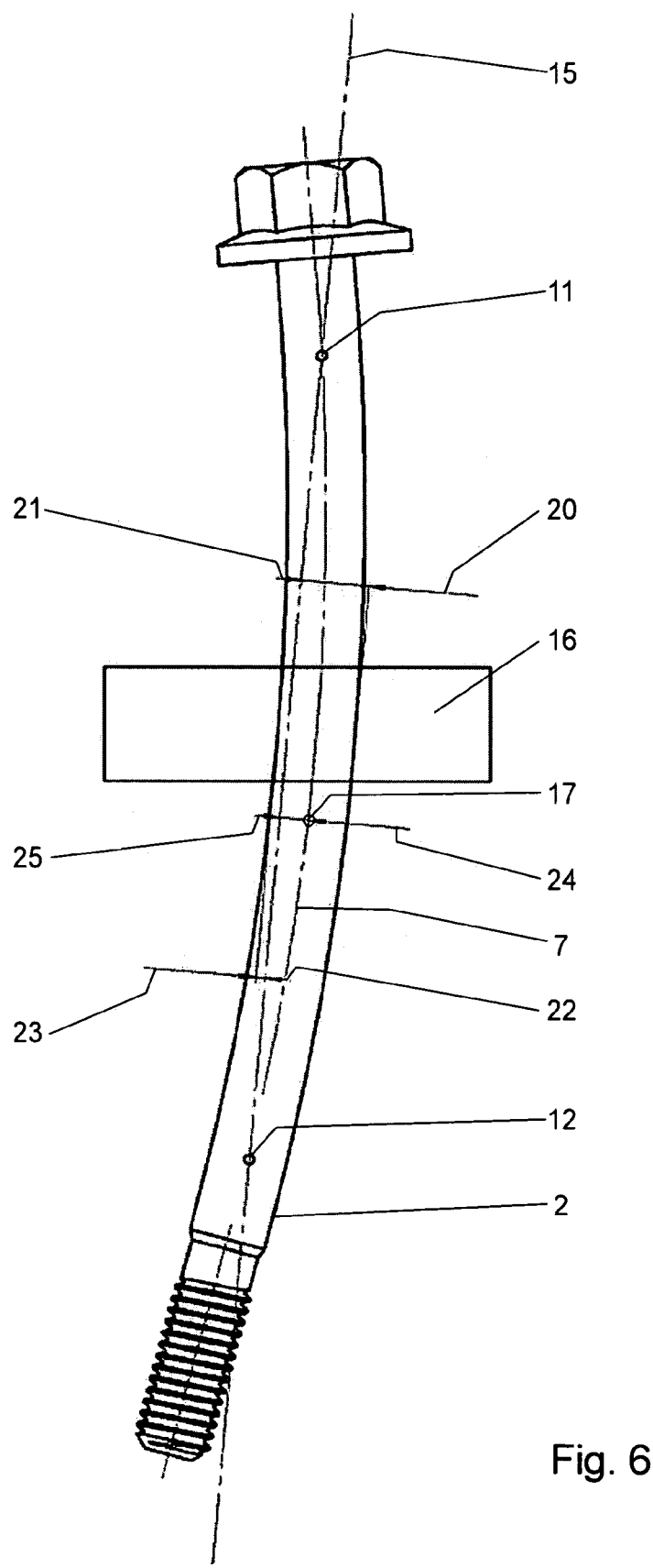
FIG. 6 illustrates the determination of the deviation of a fastener by the determination method of the radius deviation.
Figure 7:
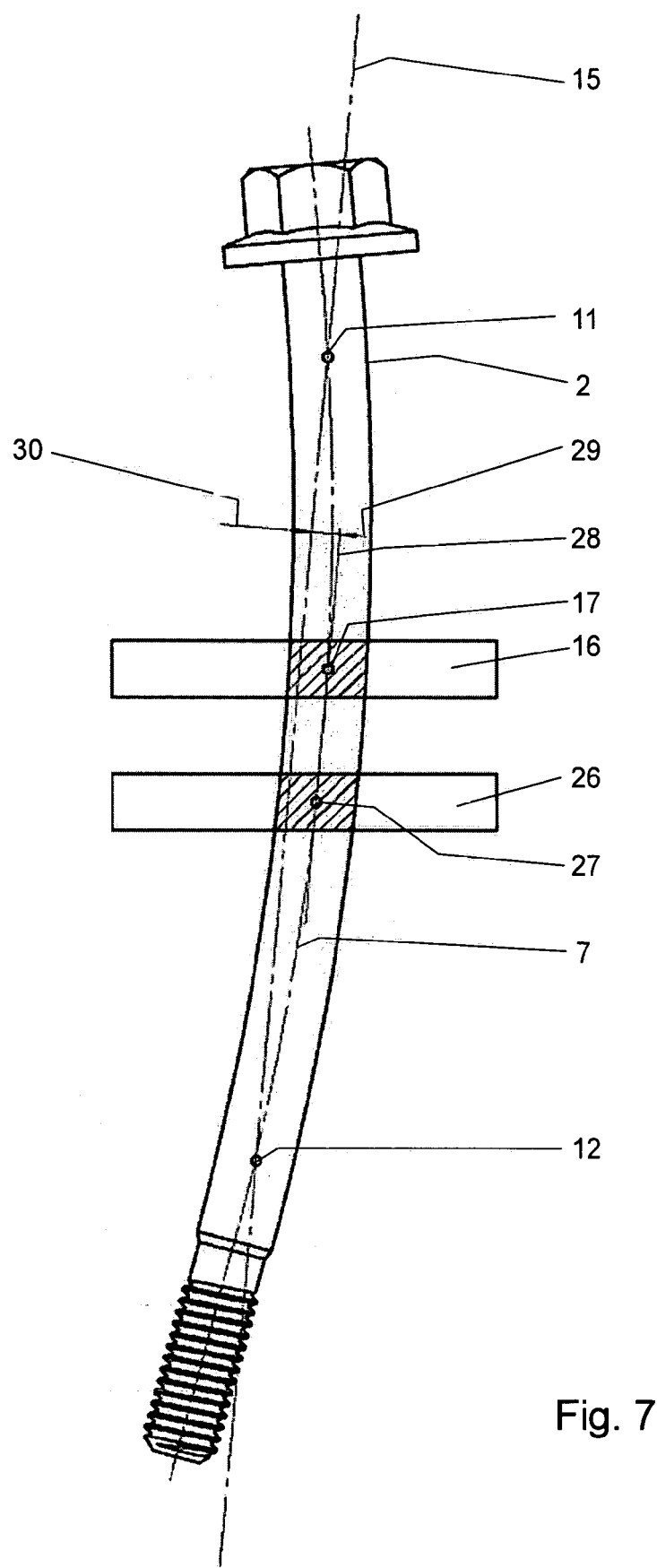
FIG. 7 illustrates the determination of the deviation of the fastener by the determination method of the inspection axis.

FIG. 6 illustrates another determination method. In this case, it is the determination method of the radius deviation. In this method, the distance between a first radial outer point of the inspection region 16 with respect to the reference axis 15 is determined. This analysis is repeated for the second radial outer point being located at the opposite radial side of the fastener 2 in the inspection region 16. This is illustrated by the arrows 20, 21 and 22, 23. The position of the inspection point 17 results from these distances. The distance of the inspection point 17 to the reference axis 15 is to be seen from arrows 24, 25. Another determination method is illustrated in FIG. 7. The illustrated determination method is the one of the inspection axis. For this method, a second inspection region 26 in addition to the first inspection region 16 is defined. An inspection point 17 is determined in the inspection region 16 and an inspection point 27 is determined in the inspection region 26 as the center of the area of the fastener 2 in the inspection regions 16 and 26, respectively. The two inspection points 17, 27 are interconnected by an inspection axis 28. In the following, the distance of the inspection axis 28 with respect to the reference axis 15 is determined. This is illustrated by arrows 29, 30.

The determination methods which have been described above with respect to FIGS. 3 to 7 may be used alternatively or cumulatively. Preferably, at least two different determination methods are used one after the other. This results in two preliminary inspection points 17 and 17', respectively, from which the final inspection point is calculated. For this calculation, possibly weighing factors are used. It has been found to be advantageous to use the determination method of the center of the area, of the deviation of the radius as well as of the inspection axis for determining an inspection point 17, 17'.

Figure 8:
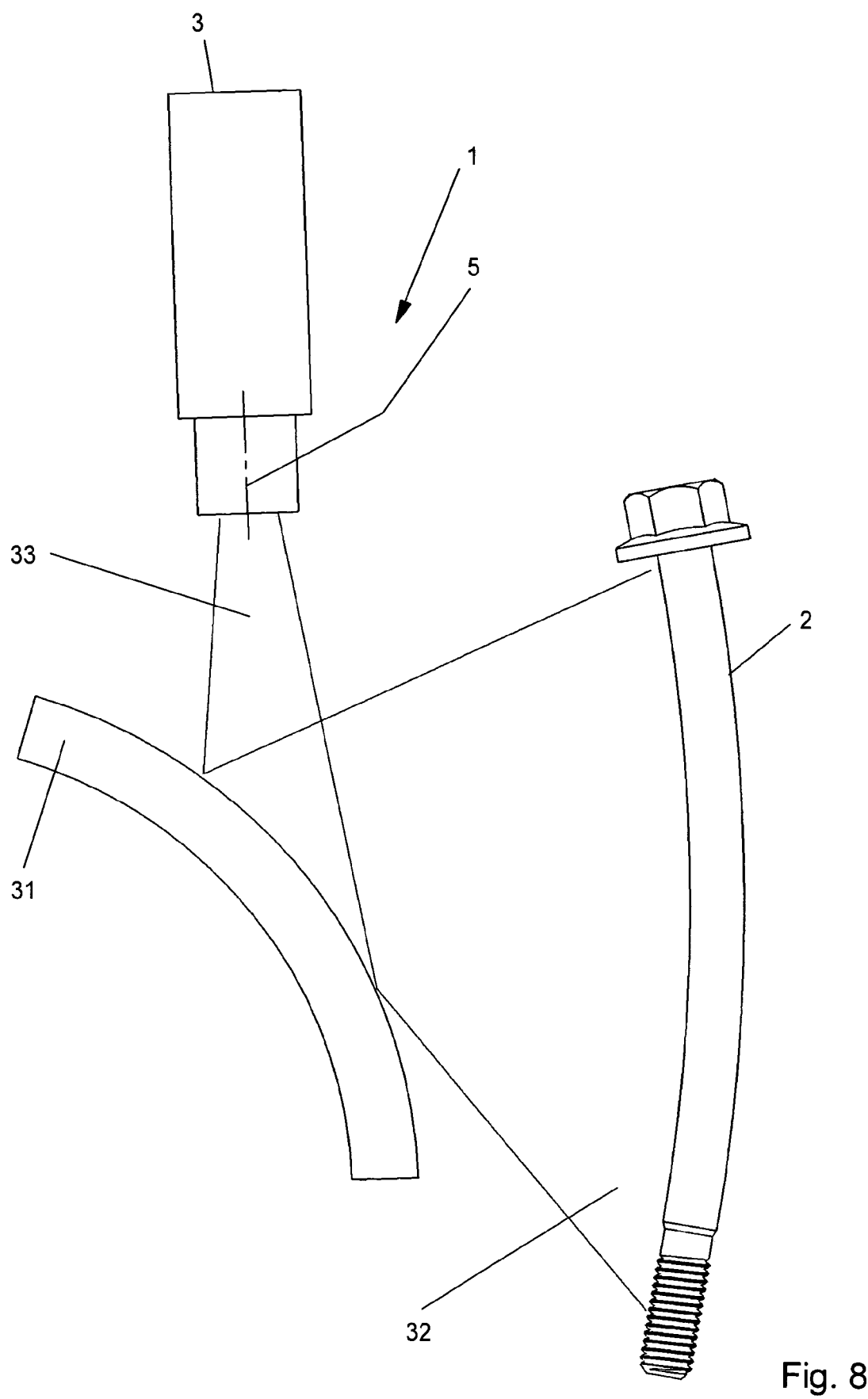
FIG. 8 illustrates the general design of another exemplary embodiment of the novel apparatus for determining the deflection of a fastener using a mirror.

FIG. 8 illustrates the general design of another exemplary embodiment of the novel apparatus 1 for determining the deflection of a fastener 2. In the present case, the arrangement of the cameras 3, 4 is different. For reasons of clarity of the drawings, only the camera 3 is illustrated. It is to be understood that the camera 4 also exists. Once again, the optical axis 6 of the camera 4 is arranged to be approximately perpendicular with respect to the optical axis 5 of the camera 3. In this illustrated exemplary embodiment, a curved mirror 31 is used as a distorting optical system. When analyzing a long fastener 2, there may be problems with the maximum resolution of the camera 3 and 4, respectively. The resolution of the camera 3 and 4, respectively, and thus the measuring accuracy is directly proportional to the number of dots. In case of a large image field due to a substantial length of the fastener 2, there may be reduced exactness in the transverse direction of the fastener 2. In this case, the use of the mirror 31 is advantageous since it optically upsets only in one direction for attaining the imaging field 33 being smaller than the image field 32. The distortions resulting on the recording chip of the camera 3 and 4, respectively, are insofar acceptable as it is not desired to determine the length of the fastener 2, but instead only its deviation in relation to a reference axis.

Many variations and modifications may be made to the preferred embodiments of the invention without departing substantially from the spirit and principles of the invention. All such modifications and variations are intended to be included herein within the scope of the present invention, as defined by the following claims.

We claim:

1. An apparatus for determining the deflection of a fastener in at least two substantially perpendicular planes, comprising:

a first camera, said first camera having an optical axis, said first camera being designed and arranged to record a first image of the fastener;

a unit, said unit being designed and arranged to determine two first reference points of the fastener in the first image for determining a first reference axis of the fastener, the first reference axis extending through the two first reference points;

a unit, said unit being designed and arranged to determine a first inspection point in a first inspection region in the first image;

a unit, said unit being designed and arranged to compare the position of the first inspection point with the respective position of the first reference axis for determining a first deviation;

a second camera, said second camera having an optical axis, the optical axis of said second camera being arranged to be substantially perpendicular to the optical axis of said first camera, the optical axes of said first and second camera approximately intersecting in the longitudinal axis of the fastener, said second camera being designed and arranged to record a second image of the fastener;

a unit, said unit being designed and arranged to determine two second reference points of the fastener in the second image for determining a second reference axis of the fastener, the second reference axis extending through the two second reference points;

a unit, said unit being designed and arranged to determine a second reference point in a second inspection region in the second image;

a unit, said unit being designed and arranged to compare the position of the second inspection point with the respective position of the second reference axis for determining a second deviation.

2. The apparatus of claim 1, wherein said unit is designed and arranged to determine the actual deflection of the fastener based on the first and second deviation and the Pythagorean Theorem.

3. The apparatus of claim 1, wherein said units are designed as one common unit.

4. The apparatus of claim 3, wherein said common unit is designed and arranged to determine the actual deflection of the fastener based on the first and second deviation and the Pythagorean Theorem.

5. The apparatus of claim 1, wherein said units are designed as separate units.

6. The apparatus of claim 5, wherein at least one of said units is designed and arranged to determine the actual deflection of the fastener based on the first and second deviation and the Pythagorean Theorem.

7. The apparatus of claim 1, wherein said unit for determining the first and second inspection point is designed and arranged to use at least two determination methods, the determination methods analyzing the contour of the fastener in the respective inspection region.

8. The apparatus of claim 7, wherein one of the determination methods is the one of the center of the area.

9. The apparatus of claim 1, wherein said unit for determining the first and second inspection point is designed and arranged to use three different determination methods, the determination methods analyzing the contour of the fastener in the respective inspection region.

10. The apparatus of claim 9, wherein the three determination methods are the one of the center of the area, the one of the radius deviation and the one of the inspection axis.

11. A method of determining the deflection of a fastener in two substantially perpendicular planes, said method comprising the steps of:

recording a first image of the fastener with a first camera having an optical axis;

determining two first reference points of the fastener in the first image for determining a first reference axis of the fastener, the first reference axis extending through the two first reference points;

determining a first inspection point in a first inspection region in the first image;

comparing the position of the first inspection point with the respective position of the first reference axis for determining a first deviation;

recording a second image of the fastener with a second camera having an optical axis, the optical axis of the second camera being substantially perpendicular to the optical axis of the first camera, the optical axes of the first and second camera approximately intersecting in the longitudinal axis of the fastener;

determining two second reference points of the fastener in the second image for determining a second reference axis of the fastener, the second reference axis extending through the two second reference points;

determining a second reference point in a second inspection region in the second image; and comparing the position of the second inspection point with the respective position of the second reference axis for determining a second deviation.

12. The method of claim 11, further comprising the step of determining the actual deflection of the fastener based on the first and second deviation and the Pythagorean Theorem.

13. The method of claim 12, wherein the first and second inspection point are each determined by at least two determination methods, the determination methods analyzing the contour of the fastener in the respective inspection region.

14. The method of claim 13, wherein one of the determination methods is the one of the center of the area.

15. The method of claim 12, wherein the first and second inspection point are each determined by three determination methods, the determination methods analyzing the contour of the fastener in the respective inspection region.

16. The method of claim 15, wherein the determination methods are the one of the center of the area, the one of the radius deviation and the one of the inspection axis.

17. The method of claim 11, wherein the first and second inspection point are each determined by at least two determination methods, the determination methods analyzing the contour of the fastener in the respective inspection region.

18. The method of claim 17, wherein one of the determination methods is the one of the center of the area.

19. The method of claim 11, wherein the first and second inspection point are each determined by three determination methods, the determination methods analyzing the contour of the fastener in the respective inspection region.

20. The method of claim 19, wherein the determination methods are the one of the center of the area, the one of the radius deviation and the one of the inspection axis.

* * * * *